(12) United States Patent
Dana et al.

(10) Patent No.: US 8,319,821 B2
(45) Date of Patent: Nov. 27, 2012

(54) POLARIZATION-BASED SHADOW DETECTION

(75) Inventors: Kristin Jean Dana, Spring Lake, NJ (US); Richard Mark Friedhoff, New York, NY (US); Bruce Allen Maxwell, Springfield, PA (US); Steven Joseph Bushell, Cranston, RI (US); Casey Arthur Smith, Ithaca, NY (US)

(73) Assignee: Tandent Vision Science, Inc., San Francisco, CA (US)

( * ) Notice: Subject to any disclaimer, the term of this patent is extended or adjusted under 35 U.S.C. 154(b) by 1544 days.

(21) Appl. No.: 11/810,444

(22) Filed: Jun. 5, 2007

(65) Prior Publication Data

US 2008/0303891 A1 Dec. 11, 2008

(51) Int. Cl.
*G02B 27/46* (2006.01)
(52) U.S. Cl. .......................................... 348/25; 359/558
(58) Field of Classification Search ................... 348/25; 359/558
See application file for complete search history.

(56) References Cited

U.S. PATENT DOCUMENTS

| | | | | |
|---|---|---|---|---|
| 5,890,095 A * | 3/1999 | Barbour et al. | ................. | 702/40 |
| 5,965,874 A * | 10/1999 | Aso et al. | ...................... | 250/225 |
| 6,046,655 A * | 4/2000 | Cipolla | ........................ | 333/137 |
| 6,188,819 B1 * | 2/2001 | Kosaka et al. | ................... | 385/39 |
| 6,447,122 B1 | 9/2002 | Kobayashi et al. | ............. | 353/97 |
| 6,630,289 B1 * | 10/2003 | Kwok et al. | .................. | 430/321 |
| 7,055,388 B2 * | 6/2006 | Arndt et al. | ..................... | 73/597 |
| 7,203,362 B2 | 4/2007 | Sato et al. | ..................... | 382/173 |
| 7,381,507 B2 * | 6/2008 | Kwok et al. | .................... | 430/20 |
| 7,495,764 B1 * | 2/2009 | McMillan et al. | ............ | 356/364 |
| 2006/0177149 A1 | 8/2006 | Friedhoff et al. | ............ | 382/274 |

* cited by examiner

*Primary Examiner* — David Eng
(74) *Attorney, Agent, or Firm* — Davidson, Davidson & Kappel, LLC

(57) ABSTRACT

In a first exemplary embodiment of the present invention, an automated, computerized method is provided for determining an illumination flux condition in a scene. The method comprises the steps of generating and storing a sequence of images of the scene, each one of the sequence of images comprising an array of pixels and corresponding to the scene photographed in a preselected polarization direction, different from the polarization direction of other ones of the sequence of images, determining a polarization sequence vector for at least one pixel in the array, as a function of color information for the pixel in the array, among the sequence of images; and utilizing the polarization sequence vector to determine one of a shadowed and lit illumination condition for the at least one pixel.

6 Claims, 4 Drawing Sheets

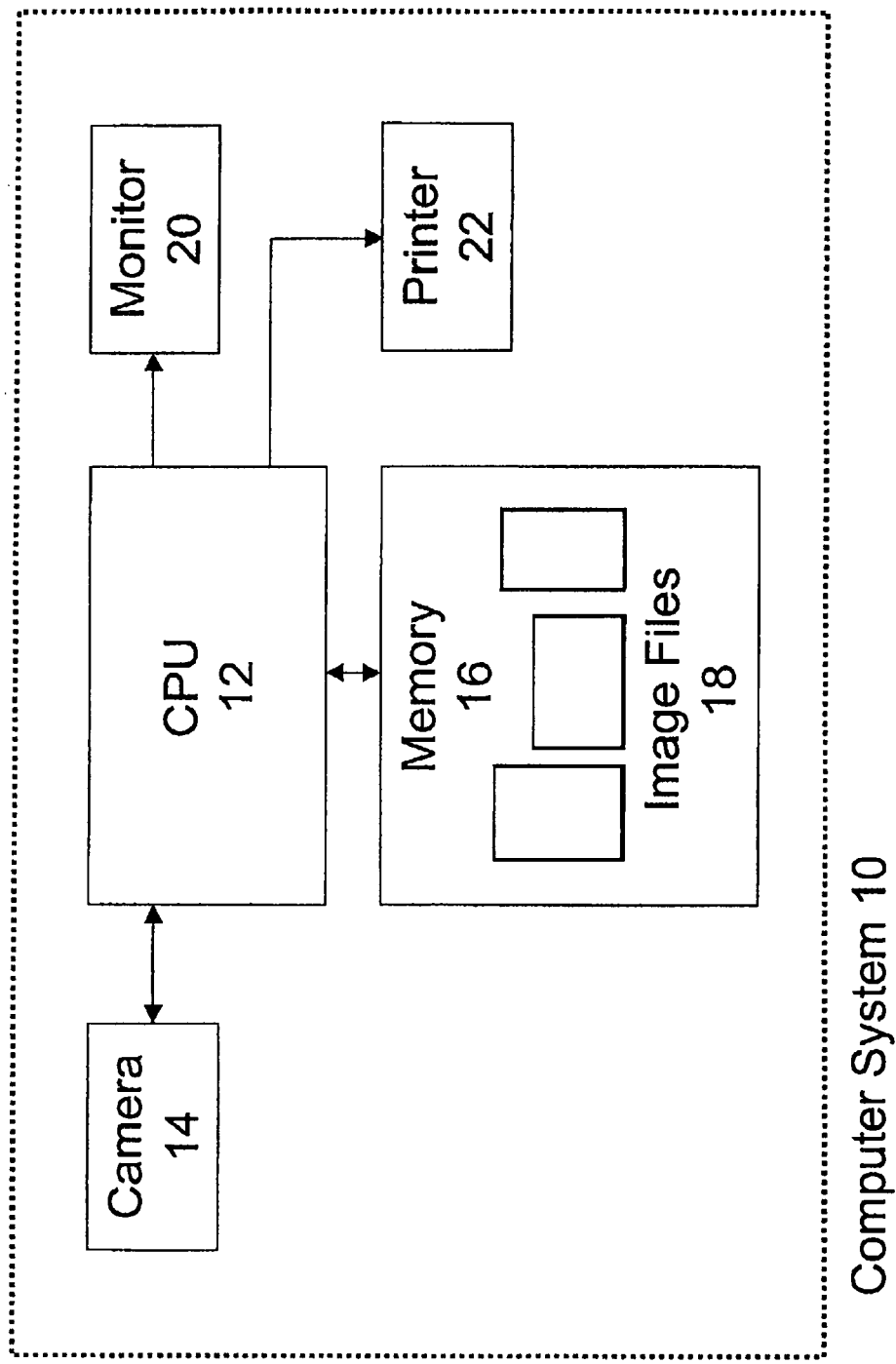
Figure 1: Computer System Configured to Operate on Images

| P(1, 1) | P(1, 2) | ... | P(1, M) |
| P(2, 1) | P(2, 2) | | |
| P(3, 1) | P(3, 2) | | |
| ... | | | |
| P(N, 1) | ... | | P(N, M) |

Figure 2: Pixel Array for Storing Image Data

Image File 18

POLARIZATION-BASED SHADOW DETECTION

BACKGROUND OF THE INVENTION

Many significant and commercially important uses of modern computer technology relate to images. These include image processing, image analysis and computer vision applications. A challenge in the utilization of computers to accurately and correctly perform operations relating to images is the development of algorithms that truly reflect and represent physical phenomena occurring in the visual world. For example, the ability of a computer to correctly and accurately distinguish between a shadow and a material object edge within an image has been a persistent challenge to scientists. Edge detection is a fundamental task in image processing because without accurate and correct detection of the edges of physical objects, no other processing of the image is possible. If a cast shadow is indistinguishable from the object casting the shadow, it would not be possible for the computer to recognize the object.

An early and conventional approach to object edge detection involves an analysis of brightness boundaries in an image. In the analysis it is assumed that a boundary caused by a material object will be sharp, while a boundary caused by a shadow will be soft or gradual due to the penumbra effect of shadows. While this approach can be implemented by algorithms that can be accurately executed by a computer, the results will often be incorrect. In the real world there are many instances wherein shadows form sharp boundaries, and conversely, material object edges form soft boundaries. Thus, when utilizing conventional techniques for shadow and edge recognition, there are significant possibilities for false positives and false negatives for shadow recognition. That is, for example, a material edge that imitates a shadow and is thus identified incorrectly by a computer as a shadow or a sharp shadow boundary that is incorrectly interpreted as an object boundary. Accordingly, there is a persistent need for the development of accurate and correct techniques that can be utilized in the operation of computers relating to images.

SUMMARY OF THE INVENTION

The present invention provides a method and system comprising image techniques that accurately and correctly reflect and represent physical phenomena occurring in the visual world.

In a first exemplary embodiment of the present invention, an automated, computerized method is provided for determining an illumination flux condition in a scene. The method comprises the steps of generating and storing a sequence of images of the scene, each one of the sequence of images comprising an array of pixels and corresponding to the scene photographed in a preselected polarization direction, different from the polarization direction of other ones of the sequence of images, determining a polarization sequence vector for at least one pixel in the array, as a function of color information for the pixel in the array, among the sequence of images; and utilizing the polarization sequence vector to determine one of a shadowed and lit illumination condition for the at least one pixel.

In a second exemplary embodiment of the present invention, a computer system is provided. The computer system comprises a CPU and a memory storing a sequence of image files, each one of the sequence of image files depicting a common scene, each one of the sequence of image files comprising an array of pixels and corresponding to the scene photographed in a preselected polarization direction, different from the polarization direction of other ones of the sequence of images. Pursuant to a feature of the present invention, the CPU is arranged and configured to execute a routine to determine a polarization sequence vector for at least one pixel in the array, as a function of color information for the pixel in the array, among the sequence of image files corresponding to the scene, and to utilize the polarization sequence vector to determine one of a shadowed and lit illumination condition for the at least one pixel.

In accordance with yet further embodiments of the present invention, computer systems are provided, which include one or more computers configured (e.g., programmed) to perform the methods described above. In accordance with other embodiments of the present invention, computer readable media are provided which have stored thereon computer executable process steps operable to control a computer(s) to implement the embodiments described above. The automated, computerized methods can be performed by a digital computer, analog computer, optical sensor, state machine, sequencer or any device or apparatus that can be designed or programmed to carry out the steps of the methods of the present invention.

BRIEF DESCRIPTION OF THE DRAWINGS

FIG. 1 is a block diagram of a computer system arranged and configured to perform operations related to images.

FIG. 2 shows an n×m pixel array image file for an image stored in the computer system of FIG. 1.

DETAILED DESCRIPTION OF THE PREFERRED EMBODIMENTS

Figure 3:
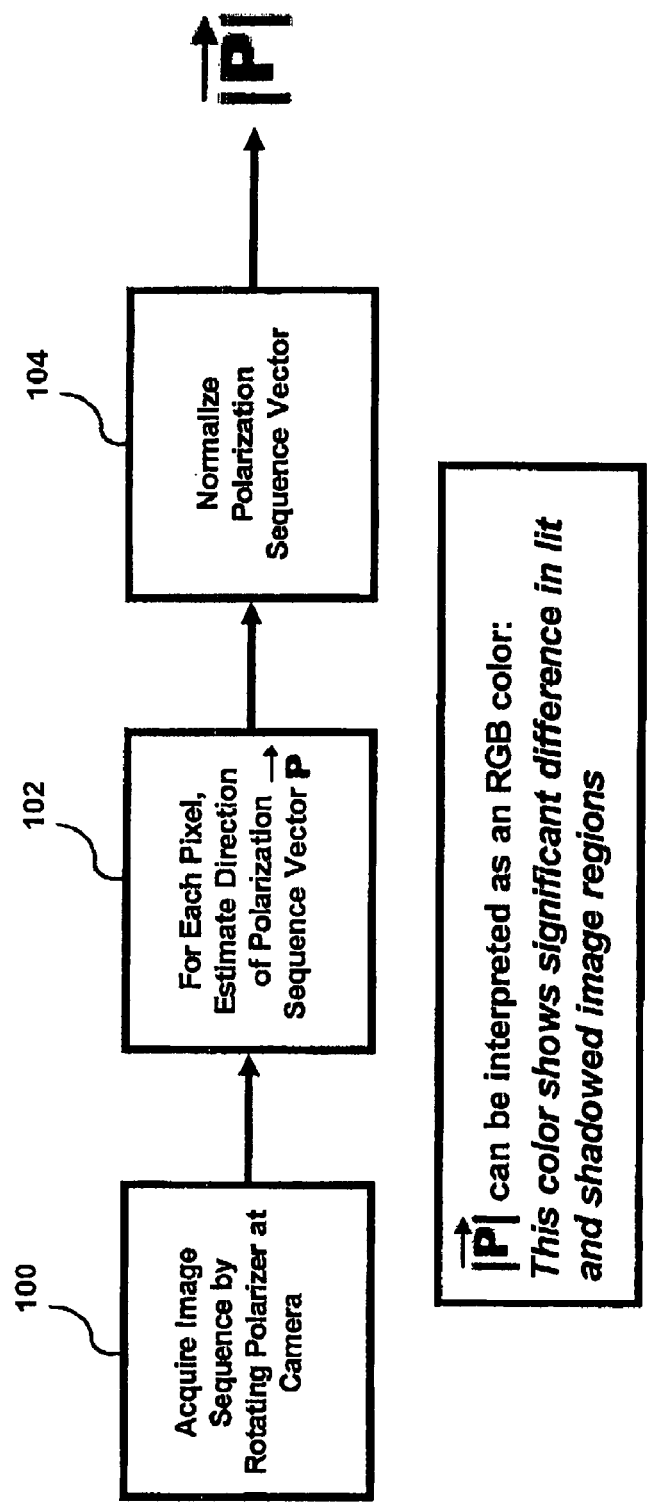
FIG. 3 is a flow chart for identifying shadowed regions of an image depicted in a sequence of image files of the type depicted in FIG. 2, as a function of polarization characteristics, according to a feature of the present invention.

Referring now to the drawings, and initially to FIG. 1, there is shown a block diagram of a computer system 10 arranged and configured to perform operations related to images. A CPU 12 is coupled to a device such as, for example, a digital camera 14 via, for example, a USB port. The digital camera 14 operates to download images stored locally on the camera 14, to the CPU 12. The CPU 12 stores the downloaded images in a memory 16 as image files 18. The image files 18 can be accessed by the CPU 12 for display on a monitor 20, or for print out on a printer 22.

Alternatively, the CPU can be implemented as a microprocessor embedded in a device such as, for example, the digital camera 14 or a robot. The CPU can also be equipped with a real time operating system for real time operations related to images, in connection with, for example, a robotic operation or an interactive operation with a user.

As shown in FIG. 2, each image file 18 comprises an n×m pixel array. Each pixel, p, is a picture element corresponding to a discrete portion of the overall image. All of the pixels together define the image represented by the image file 18. Each pixel comprises a digital value corresponding to a set of color bands, for example, red, green and blue color components (RGB) of the picture element. The present invention is applicable to any multi-band image, where each band corresponds to a piece of the electromagnetic spectrum. The pixel array includes n rows of m columns each, starting with the pixel p (1,1) and ending with the pixel p(n, m). When displaying or printing an image, the CPU 12 retrieves the corresponding image file 18 from the memory 16, and operates the monitor 20 or printer 22, as the case may be, as a function of the digital values of the pixels in the image file 18, as is generally known.

In an image operation, the CPU 12 operates to analyze the RGB values of the pixels of a stored image file 18 to achieve various objectives, such as, for example, shadow detection in the subject image. A fundamental observation underlying a basic discovery of the present invention, is that an image comprises two components, material and illumination. All spectral variations in pixel values are caused by one or the other or both of these components. A method for detecting of one of these components, for example, illumination, provides a mechanism for distinguishing material or object geometry, such as object edges, from shadows caused by illumination.

What is visible to the human eye upon display of a stored image file 18 by the CPU 12, is the pixel color values caused by the interaction between specular and body reflection properties of material objects in, for example, a scene photographed by the digital camera 14 and illumination flux present at the time the photograph was taken. The illumination flux comprises an ambient illuminant and an incident illuminant. The incident illuminant is light that causes a shadow and is found outside a shadow perimeter. The ambient illuminant is light present on both the bright and dark sides of a shadow, but is more perceptible within the dark region.

Based upon the fundamental observation of the present invention that an image comprises two components, material and illumination, the computer system 10 can be operated to differentiate between material aspects of the image such as, for example, object edges, and illumination flux through recognition of physical properties of the illumination flux. One such physical property is a spectral shift caused by the interplay between the incident illuminant and the ambient illuminant in the illumination. When one of material and illumination is known in an image, the other can be readily deduced. The spectrum for the incident illuminant and the ambient illuminant can be different from one another.

A spectral shift caused by a shadow, i.e., a decrease of the intensity of the incident illuminant, will be substantially invariant over different materials present in a scene depicted in an image. Pursuant to a feature of the present invention, this spectral shift information is detected by determination of an illuminant ratio, or a spectral ratio formed by the interplay of the incident illuminant and the ambient illuminant. A spectral ratio is a ratio based upon a difference in color or intensities between two areas of a scene depicted in an image, which may be caused by different materials, an illumination change or both. An illuminant ratio provides a basis for identifying illumination change in an image.

Moreover, in accordance with a further discovery relevant to the present invention, another physical property of illumination flux comprises polarization characteristics of the incident illuminant and the ambient illuminant. The polarization characteristics can be used to identify shadowed areas of a subject image. Direct sunlight is typically not polarized but becomes partially polarized upon reflection from a material surface. Pursuant to a feature of the present invention, an analysis is made regarding differences in polarization in light reflected from various regions of a recorded image, due to variations of the interplay of the incident illuminant and the ambient illuminant, to determine shadowed and unshadowed regions of the image. The variations of the interplay, according to a feature of the present invention, comprise differences between the polarization of the reflected incident illuminant and the polarization of the reflected ambient illuminant.

Referring now to FIG. 3, there is shown a flow chart for identifying shadowed regions of an image depicted in a sequence of image files 18 of the type shown in FIG. 2, as a function of polarization characteristics, according to a feature of the present invention. In step 100, an image of a scene is recorded in a sequence of image files 18, each one of the sequence of image files 18 corresponding to the scene photographed in a different polarization direction. The camera 14 comprises a linear response camera that is utilized to capture each of the images through a polarizer mounted on the lens of the camera 14. For example, camera 14 comprises a Canon 20D Digital, 8.2-megapixel auto focus, single lens reflex filter, 67 mm, Quantaray circular polarizer. A linear polarizer can be used in place of a circular polarizer. A linear response is achieved by capturing a raw image for each polarization with the camera 14, in our exemplary embodiment, the Canon 20D Digital.

Pursuant to a feature of the present invention, the polarizer is rotated through preselected angular orientations and an image file 18 is recorded for each angular orientation of the polarizer. For example, the polarizer can be oriented from 0° to 180° in increments of 10° with an image file 18 corresponding to each 10° incremental orientation. In general, overall image intensities are modulated as a function of polarizer direction. The modulation varies spatially and spectrally.

In step 102, the CPU 12 is operated such that for each pixel location (p (1,1) to p(n, m) (see FIG. 2)), the set of color values for a respective pixel location, throughout a sequence of image files 18 corresponding to a scene, as recorded at the various angular orientations of the polarizer, is organized as a vector in RGB space. RGB space corresponds to a three dimensional graph wherein the three axes define the red, green and blue values of a pixel, as discussed in respect of FIG. 4, below. The vector in RGB space is a polarization sequence vector $\vec{P}$ with the intensity of a pixel location traveling along the direction of $\vec{P}$, as a function of the intensity variations for the respective pixel location, throughout the sequence of image files 18 corresponding to the scene. The polarizer has the effect of modulating the intensity of polarized light with a sinusoidal multiplicative factor, thus the intensity value will travel in both positive and negative directions along $\vec{P}$. Moreover, the direction of the vector $\vec{P}$ is a function of the illumination characteristics of the pixel location, that is, lit or shadow. Thus, the direction of a polarization sequence vector $\vec{P}$ can be used to determine whether the corresponding pixel location is in a lit portion of the scene, or a portion of the scene in shadow.

Estimation of the direction of $\vec{P}$ is a three dimensional line fitting problem. An estimation of a vector direction for a set of pixel color values corresponding to a pixel location in a sequence of image files 18 of a scene at different angular orientations of the polarizer, can be achieved with standard mathematical tools such as singular value decomposition and Random Sample Consensus (RANSAC).

Singular value decomposition is described in:

Abdi, H. "[2] ((2007). Singular Value Decomposition (SVD) and Generalized Singular Value Decomposition (GSVD). In N.J. Salkind (Ed.): Encyclopedia of Measurement and Statistics. Thousand Oaks (Calif.): Sage.".

Demmel, J. and Kahan, W. (1990). Computing Small Singular Values of Bidiagonal Matrices With Guaranteed High Relative Accuracy. *SIAM J. Sci. Statist. Comput.*, 11 (5), 873-912.

Golub, G. H. and Van Loan, C. F. (1996). "Matrix Computations". 3rd ed., Johns Hopkins University Press, Baltimore. ISBN 0-8018-5414-8

Eckart, C., & Young, G. (1936). The approximation of one matrix by another of lower rank. Psychometrika, 1, 211-218.

Halldor, Bjornsson and Venegas, Silvia A. (1997). "A manual for EOF and SVD analyses of climate data". McGill University, CCGCR Report No. 97-1, Montréal, Québec, 52 pp.

Hansen, P. C. (1987). The truncated SVD as a method for regularization. *BIT*, 27, 534-553.

Horn, Roger A. and Johnson, Charles R (1985). "Matrix Analysis". Section 7.3. Cambridge University Press. ISBN 0-521-38632-2.

Horn, Roger A. and Johnson, Charles R (1991). Topics in Matrix Analysis, Chapter 3. Cambridge University Press. ISBN 0-521-46713-6.

Strang G (1998). "Introduction to Linear Algebra". Section 6.7. 3rd ed., Wellesley-Cambridge Press. ISBN 0-9614088-5-5.

RANSAC is described in:

M. A. Fischler and R. C. Bolles (June 1981). "Random Sample Consensus: A Paradigm for Model Fitting with Applications to Image Analysis and Automated Cartography". *Comm. of the ACM* 24: 381-395. DOI:10.1145/358669.358692

David A. Forsyth and Jean Ponce (2003). *Computer Vision, a modern approach*. Prentice Hall. ISBN ISBN 0-13-085198-1

Richard Hartley and Andrew Zisserman (2003). *Multiple View Geometry in computer vision*, 2nd edition, Cambridge University Press.

Figure 4:
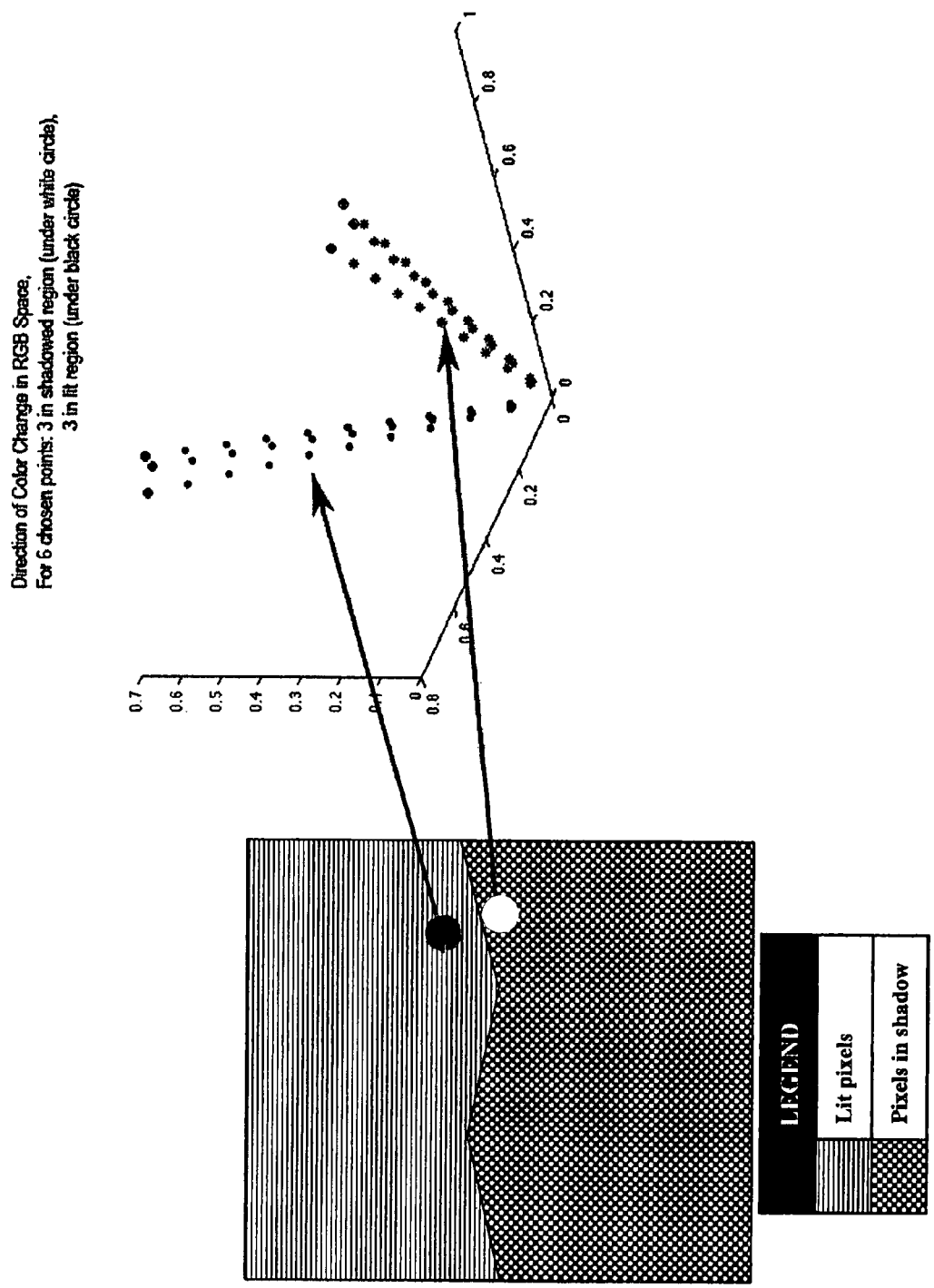
FIG. 4 is a graph plotting color values forming polarization vectors.

FIG. 4 shows a graph plotting pixel color values in an RGB space, the color values coming from selected points of a scene upon which the graph is superimposed, three in shadow and three in lit portions of the scene. The pixel color values of each selected point form a polarization sequence vector as a function of a sequence of image files 18 containing the respective point, at different angular orientations of the polarizer, as described above. The points illustrated in the graph of FIG. 4 where selected manually. A direction in the RGB color space for each selected point was estimated using one of the mathematical tools described above. The color of each point changes as a function of the angular orientation of the polarizer, but the direction of change is different for lit points as opposed to points in shadow. In the graph of FIG. 4, the polarization sequence vectors corresponding to lit points are indicated by an arrow from a lit portion of the scene, while each of the points in shadow are indicated by an arrow from a shadowed portion of the scene.

Referring back to FIG. 3, in step 104, the CPU 12 operates, with respect to each polarization sequence vector $\vec{P}$ to generate a normalized value of the vector $|\vec{P}|$. The normalized value $|\vec{P}|$ is interpreted as an RGB value that reflects a significant difference between pixel locations in lit and shadowed areas of a scene. The CPU 12 further operates to classify each pixel location as in shadow or lit, as a function of the normalized values for the respective pixel locations.

In the preceding specification, the invention has been described with reference to specific exemplary embodiments and examples thereof. It will, however, be evident that various modifications and changes may be made thereto without departing from the broader spirit and scope of the invention as set forth in the claims that follow. The specification and drawings are accordingly to be regarded in an illustrative manner rather than a restrictive sense.

What is claimed is:

1. An automated, computerized method for determining one of a shadowed and lit illumination condition in a scene, comprising the steps of:

generating and storing in a computer memory a sequence of images of the scene, each one of the sequence of images comprising an array of pixels, each one of the array of pixels comprising a set of color bands, and corresponding to the scene photographed in a preselected polarization direction, different from the polarization direction of other ones of the sequence of images;

a computer executing the following steps:

determining a polarization sequence vector for at least one pixel in the array, as a function of color information based upon the set of color bands, for the pixel in the array, among the sequence of images; and utilizing the polarization sequence vector to determine one of a shadowed and lit illumination condition for the at least one pixel.

2. The method of claim 1 wherein the step of utilizing the polarization sequence vector to determine one of a shadowed and lit illumination condition for the at least one pixel is carried out by determining a normalized value for the polarization sequence vector.

3. The method of claim 1 wherein the step of determining a polarization sequence vector for at least one pixel in the array is carried out by performing a mathematical line fitting technique with respect to the color information for the pixel in the array, among the sequence of images.

4. The method of claim 3 wherein the mathematical line fitting technique comprises a singular value decomposition technique.

5. The method of claim 3 wherein the mathematical line fitting technique comprises a RANSAC technique.

6. A computer system which comprises:

a CPU; and a memory storing a sequence of image files, each one of the sequence of image files depicting a common scene, each one of the sequence of image files comprising an array of pixels, each one of the array of pixels comprising a set of color bands, and corresponding to the scene photographed in a preselected polarization direction, different from the polarization direction of other ones of the sequence of images;

the CPU arranged and configured to execute a routine to determine a polarization sequence vector for at least one pixel in the array, as a function of color information based upon the set of color bands, for the pixel in the array, among the sequence of image files corresponding to the scene, and to utilize the polarization sequence vector to determine one of a shadowed and lit illumination condition for the at least one pixel.

* * * * *